United States Patent [19]

Takigawa

[11] Patent Number: 5,040,792

[45] Date of Patent: Aug. 20, 1991

[54] DECOMPOSABLE GOLF TEE COMPOSITION

[76] Inventor: Bin Takigawa, 1-48-7 Sakuragaoka, Tama-shi, Tokyo, Japan

[21] Appl. No.: 335,220

[22] Filed: Apr. 7, 1989

[30] Foreign Application Priority Data

Jun. 27, 1988 [JP] Japan .................. 63-156698
Nov. 21, 1988 [JP] Japan .................. 63-292495

[51] Int. Cl.$^5$ .............................................. A63B 67/00
[52] U.S. Cl. ..................................... 273/33; 273/212
[58] Field of Search ...................................... 273/33, 212

[56] References Cited

U.S. PATENT DOCUMENTS 4,126,438 11/1978 Pulli et al. ............................... 71/3

Primary Examiner—William R. Dixon, Jr.
Assistant Examiner—Chris Gallo
Attorney, Agent, or Firm—Bruce L. Adams; Van C. Wilks

[57] ABSTRACT

The mold composition is compress-moldable at the substantial room temperature into a golf tee, and is decomposable when absorbing water. The mold composition contains 10 to 98 weight parts of pulverized natural organic material, and 2 to 90 weight parts of pulverized natural inorganic material mixed with the natural organic material to constitute 100 weight parts of powder mixture. The 100 weight parts of powder mixture is kneaded with less than 60 weight parts of water containing 0.2 to 10.0% by weight of hydrophilic adhesive to form the mold composition.

11 Claims, No Drawings

DECOMPOSABLE GOLF TEE COMPOSITION

BACKGROUND OF THE INVENTION

The present invention relates to a golf tee or small peg with a concave top for holding a golf ball for an initial drive, and, more specifically relates to a golf tee composition having plasticity easy moldability at low cost, brittle resistance, bending resistance and decomposability.

The conventional disposable golf tee is generally composed of plastic material. Used golf tees are typically left on a golf ground and must be collected by golf course keepers to avoid possible injury to golf players, wasted golf tees, there. In order to avoid such painstaking work of collecting used golf tees, there have been proposed various types of decomposable golf tee compositions which would return to soil by weathering and therefore need not to be recovered.

For example, Japanese utility model registration application, first publication number 102073/1984, a discloses decomposable golf tee composed of compress-molded sawdust.

Japanese utility model registration application, first publication number 73503/1985 a discloses a decomposable golf tee in which a golf ball supporting portion, a tip end portion and an interconnecting portion therebetween are composed of solid fertilizer material.

Japanese utility model registration application, first publication number 78955/1987, a discloses a decomposable golf tee made by mixing wood fiber or powder with plastic adhesive, heat-molding the mixture under pressure, and ejecting and drying the molded body to produce the golf tee.

According to this prior art, since the mixture of wood fiber or powder and adhesive does not have a sufficient plasticity at room temperature even under considerable pressure, the mixture must be heat-molded individually within a mold cavity.

Japanese utility model registration application, first publication number 186765/1987, discloses a decomposable golf tee molded with inorganic powder material which does not contaminate the soil with fertilizes soil, and the mixture of which and water can be solidified during the molding process. This inorganic powder material may contain fertilizer. This inorganic powder material may be composed of soil and inorganic fertilizer.

Japanese utility model resistration application, first publication number 188870/1987, discloses a decomposable golf tee having physical strength sufficent to support a golf ball during use thereof, and being molded with powder material such as specific soil decomposable immediately by weathering due to exposure to rain and sun light. The powder material may contain additive such as insecticide and fertilizer. For molding the golf tee, soil and insecticide or fertilizer are kneaded togther with water, and the kneaded material is molded to form a golf tee.

SUMMARY OF THE INVENTION

An object of the present invention is to provide a new decomposable composition moldable to a form golf tee and different from the above-mentioned known compositions.

Another object of the present invnvtion is to provide a mold material moldable at room temperature to form a golf tee. Further object of the present invention is to provide a disposable golf tee having a sufficient physical strength during use thereof and being easily decomposable by weather the after use thereof. Still a further object of the present invention is to provide a disposable golf tee decomposable when left on the golf course to fertilize the earth soil without contaminating the same.

In order to achieve the above-mentioned objects, according to the present invention, the new decomposable mold material for a golf tee is composed of natural organic substances and natural inorganic substances kneaded together with water containing a hydrophilic adhesive to form the mold material which can initially flow and then can be solidified at room temperature during a compressed molding process and lastly heat-cured. For making the golf tee, natural organic powder such as wasted rice bran and natural inorganic powder such as kaolin are kneaded together with water containing the hydrophilic adhesive to form fluid mold material, then the fluid mold material is molded within tee-shape cavity at the substantial room temperature under pressure, and the solidified body is ejected from the mold and dried or cured to produce the golf tee.

DETAILED DESCRIPTION OF THE INVENTION

According to one embodiment of the present invention, 10 to 98 weight parts of dry and fine organic powder and 2 to 90 weight parts of dry and fine inorganic powder are mixed with each other to prepare 100 weight parts of powder mixture. The powder mixture of 100 weight parts is kneaded with less than 60 weight parts of water containing 0.2 to 10.0% of hydrophilic adhesive to prepare a mold material. The mold material is compress-molded within a tee-shape cavity, and the molded solid body is ejected or released from the cavity and is dried to produce the golf tee.

The organic powder is selected from pulverized vegetables including dry powdery starch, powder of grain such as pearl berley, corn and wheat, grain rind powder such as rice bran, wheat bran and tofu-dregs, wood powder or sawdust, and mixtures thereof.

The inorganic powder is selected from pulverized minerals including Kaolin, Japanese acid clay, Diatomaceous earth, bentonite, natural clay, and mixtures thereof.

The hydrophilic adhesive is selected from gelatine or glue, denatured starch, casein salt, carboxymethyl cellulose(CMC), methyl cellulose, gum latex, polyacetic acid vinyl ester emulsion, and polyacrylic acid ester emulsion..

The above examplified organic materials must be finely pulverized before the preparation of the mold material. If coarsely pulverized organic material were used to prepare the fluid mold material, the molded body made from such material would be brittle and could not be ejected safely from the mold cavity by application of air pressure. In this connection, the starch and grain can be easily fine-pulverized. However cheaper and therefore preferrable organic materials such as rice, wheat bran and sawdust must be carefully fine-pulverized by a specific efficient grinder.

The starch and grain can be easily fine-pulverized for use as the material of the golf tee. Especially, the mixture of starch and Kaolin can be molded as the white color golf tee. The grain powders may exhibit light yellow to dark brown color tone according to their nature. Since the starch and grain contain carbohydrate, they must be dried at room temperature and thereby need a considerably long drying time. In addition the golf tee made from the starch or grain powder has a relatively small bending strength.

On the other hand, the rind such as rice bran and wheat bran and the sawdust must be carefully and finely pulverized to prepare the mold material. When using these organic materials as the mold material, the organic material must be added with at least 2 weight % of the inorganic material. If the pure rice bran, for example, 100% were molded into the golf tee within a cavity, the molded body would be hardly ejected due to its brittle nature. Namely, the addition of the inorganic material can increase moldability of the mixture of organic and inorganic materials due to the binding feature property of the added inorganic material to facilitate injection and ejection processes.

In addition, the inorganic material can reduce the degree of coloring of the golf tee due to the organic material from dark yellow to light yellow. If only the organic material were used together with an increased amount of added water containing hydrophilic adhesive, the fluidity of the mixture would be improved, but the molded body would be too soft and would be difficult to treat, and would require longer drying or curing time to increase production cost.

The preferrable inorganic material may be selected from kaolin, Japanese acid clay, diatomaceous earth, bentonite natural clay, and mixtures thereof.

Among them, Kaolin is most preferable as the inorganic material component because of its white color tone which would reduce the coloring degree of the molded golf tee due to the organic material component. The addition of inorganic material can improve the fluidity or plasticity and moldability of the mixture due to its binding property, can reduce the coloring degree of the molded golf tee and can increase the physical strength of the golf tee. However, the added amount of inorganic material should be at most 90% by weight so as to maintain the fast decomposability of the golf tee due to the decay of the organic material component. The natural hydrophilic adhesive including water-soluble and water-disperseable adhesive is selected from gelatine glue, denatured starch such as dextrin and alpha-starch, casein salt, gum latex, CMC, and methyl cellulose. Artificial or synthesized polymer adhesive can be also used such as polyacetic acid vinyl ester emulsion and polyacrylic acid ester emulsion. Among these adhesives, gelatine denatured starch and casein salt do not substantially change the fluidity of the kneaded mixture of organic and inorganic powders or the strength of the molded golf tee. However, when using gelatine and casein salt, the added amount thereof should be greater than that of remaining adhesives in order to maintain a desired physical strength of the product. For example, c. casein salt should be used in the amount of 8% by weight with respect to solvent water. Further, the molded product containing gum latex does not have a significant physical strength. The addition of CMC or methyl cellulose can improve the physical strength of the molded product even in the amount of 0.5% by weight with respect to water solvent. However, methyl cellulose is more expensive than CMC. Either of polyacetic acid vinyl ester emulsion and polyacrylic acid ester emulsion of about 50% concentration is available in the market.

These emulsions are dispersed into water by 0.5 weight % relative thereto and are used to form golf tees. These emulsions function similar to those described above, and the obtained golf tees are not observed to change. Polyacetic acid vinyl ester emulsion is more inexpensive than polyacrylic acid ester emulsion. The concentration of adhesive in the solvent water affects greatly the strength of the molded product. For example, if the concentration of adhesive is increased from 0.2% to 5%, the physical strength of the product (bending strength) is greatly increased. However, with increase of the adhesive concentration the ejection or release of the molded body tends to difficult.

The strength of the molded body depends on the inherent binding ability of the material components as well as adhesiveness of the added adhesive. Therefore, excessive addition of the adhesive is not necessary and tends to cause the problem such as difficulty of mold release. Further, the molded body requires only a moderate strength comparable to the breaking strength of a wood match splint. The concentration of adhesive should be determind also in view of production cost. Accordingly, the preferrable range of adhesive concentration is set from 0.2% to 10%. The added amount of water-affinitive or water-soluble adhesive influences the fluidity of the kneaded mold material.

The added amount of water is selected from 35 to 60% by weight of the total amount of organic and inorganic materials according to the present invention. The kneaded mold material does not have desired fluidity or plasticity when the added water amount is 30% by weight of the mixed organic and inorganic powders. The kneaded mold material exhibits the optimum fluidity for molding when the added water amount is in the range of 40 to 55% by weight.

Further, with increase of the added water amount, the fluidity of kneaded material is increased, but the of molded body from such material is too soft and difficult to treat. Moreover, when the added water amount exceeds 55% by weight, the molded body needs a long drying time to thereby increase the production cost. Although the water-affinitive or hydrophilic adhesive has its inherent bonding ability, the fluidity of the kneaded material and the plasticity of molded body mainly depend on the added amount of water according to the present invention.

As understood from the above discussion, for making the golf tee according to the present invention, 98 to 10 weight parts of dried and finely pulverized organic material and 2 to 90 weight parts of also dried and finely pulverized inorganic material are mixed with each other to prepare 100 weight parts of the powder mixture. The mixture is kneaded with less than 55 weight parts of water containing hydrophilic adhesive by 0.2 to 10.0%. The kneaded material is compress-molded within a tee-shape mold cavity. The molded body is released from the cavity and is dried to produce the golf tee.

The thus obtained golf tee has considerable brittle-resistance and physical strength (bending-resistance), and can be inserted into hard soil.

The thus obtained golf is examined to determine the decomposability or collapse feature thereof. When the golf tee is dipped or immersed in water, the surface of dipped golf tee soon swells and gradually the swelling progresses toward the center portion of the dipped golf tee. Finally, the dipped golf tee is completely collapsed after two hours of dipping treatment. This is the most significant feature of the golf tee according to the present invention. The mold material is available at low cost with vast quantity. The inventive golf tee can be mass-produced.

Even if the golf tees are left on the golf ground after use thereof, the wasted golf tees are easily decomposed by rain. The decomposed material does not contaminate the soil, but rather fertilizes the soil.

EXAMPLE 1

Dried and finely pulverized organic material of rice bran 9.5 g, and dried and finely pulverized inorganic material of Kaolin 0.5 g were mixed with each other. The mixed powder material was kneaded with water 5.5 g containing 0.5 g of casein soda. The well kneaded material was compress-injected into a tee-shape mold cavity to mold a golf tee body. The molded body was ejected by means of air pressure and dried to make the final product.

The thus obtained golf tee had a yellow and brown surface color tone and a breaking strength (bending strength) substantially equivalent to that of a wood match splint.

EXAMPLE 2

Finely pulverized rice bran 9.0 g, and dried and finely pulverized Japanese acid clay 1.0 g were mixed with each other, and then kneaded with water solution 5.0 g containing 0.3% of CMC. The kneaded mixture was compress-molded within a tee-shape mold cavity and released and dried to produce a golf tee. The golf tee had a yellow and brown color tone, and a physical strength similar to that of EXAMPLE 1.

EXAMPLE 3

Dry powder of starch 8 g, and dried and finely pulverized Kaolin 2 g were mixed with each other, and then kneaded with water solution 4.5 g containing 0.3% of CMC. The kneaded mixture was compress-molded within a tee-shape mold cavity. The molded body was released and dried to obtain the golf tee. The golf tee had a white color tone and the strength thereof was slightly smaller than that of EXAMPLE 1.

EXAMPLE 4

Dried and finely pulverized wheat bran 7 g, and dried and finely pulverized diatomaceous earth 3 g were mixed with each other, and then kneaded with water 4.5 g containing 0.5 g of polyacetic acid vinyl ester emulsion.

The thus kneaded mixture was compress-molded within the tee-shape mold cavity and thereafter the released mold body was dried or cured to produce the golf tee. The tee had a yellow and brown surface color tone, and a strength similar to that of a wood match splint.

EXAMPLE 5

Pulverized rice bran 5.5 g and pulverized Kaolin 4.5 g were mixed with each other, and then kneaded with water 4.5 g containing 0.5 g of polyacrylic acid ester emulsion. The kneaded mixture was compress-molded within a tee-shape metal mold cavity, and thereafter the released body was dried or cured to obtain the final product. The product had a light yellow-brown surface color tone and a physical strength a little greater than that of a wood match splint.

EXAMPLE 6

5 weight parts of commercially available starch and 6 weight parts of Japanese acid clay were well mixed within each other, and then well kneaded with 6 weight parts of water solution containing 0.3% of polyacetic acid vinyl emulsion. The kneaded mixture was compress-injected into a tee-shape mold cavity by means of dispenser.

The molded body was released by means of compressed air and dried at relatively low temperature. The product had white color tone and sufficient strength effective to insert the tee into the normal soil. When the product was immersed within water, the product was decomposed within 10 minutes.

EXAMPLE 7

3 weight parts of finely pulverized rice bran and 8 weight parts of Kaolin were mixed with each other, and then the mixture was well kneaded with 6 weight parts of water solution containing 0.3% of polyacetic acid vinyl ester emulsion. The kneaded mixture was molded to form a golf tee, which had a white-gray color tone and sufficient strength.

What is claimed is:

1. A mold composition compress-moldable at substantially room temperature into a golf tee and decomposable when absorbing water, comprising: 10 to 98 weight parts of pulverized natural organic waste material selected from the group consisting of rice bran, wheat bran, tofu-dregs, and sawdust; 2 to 90 weight parts of pulverized natural inorganic material mixed with the natural organic material to constitute 100 weight parts of powder mixture; and less than 60 weight parts of water containing 0.2 to 10.0% by weight of hydrophilic adhesive, the water being kneaded with the powder mixture to form the mold composition.

2. A mold composition according to claim 1; wherein the composition includes more than 35 weight parts of water.

3. A mold composition according to claim 1; wherein the natural inorganic material is selected from the group consisting of Kaolin, Japanese acid clay, diatomaceous earth, bentonite and natural clay.

4. A mold composition according to claim 1; wherein the hydrophilic adhesive is selected from the group consisting of carboxymethyl cellulose, methyl cellulose, polyacetic acid vinyl ester emulsion, and polyacrylic acid ester emulsion.

5. A mold composition according to claim 1; wherein the natural inorganic material is comprised of mineral material.

6. A mold composition according to claim 1; wherein the mineral material is comprised of earth material.

7. A water-decomposable molded golf tee comprised of a molded mixture of 10 to 98 parts by weight of pulverized natural waste organic material selected from the group consisting of rice bran, wheat bran, tofu-dregs, and sawdust and 2 to 90 parts by weight of pulverized natural inorganic material, the molded mixture being decomposable in water.

8. A water-decomposable molded golf tee according to claim 7; wherein the natural inorganic material is selected from the group consisting of Kaolin, Japanese acid clay, diatomaceous earth, bentonite and natural clay.

9. A water-decomposable molded golf tee according to claim 7; wherein the natural inorganic material is comprised of mineral material.

10. A water-decomposable molded golf tee according to claim 7; including less than 60 parts by weight of water containing 0.2 to 10.0% by weight of hydrophilic adhesive.

11. A water-decomposable molded golf tee according to claim 7; wherein the hydrophilic adhesive is selected from the group consisting of carboxymethyl cellulose, methyl cellulose, polyacetic acid vinyl ester emulsion, and polyacrylic acid ester emulsion.

* * * * *